United States Patent [19]
Touboul

[11] Patent Number: 6,167,520
[45] Date of Patent: Dec. 26, 2000

[54] SYSTEM AND METHOD FOR PROTECTING A CLIENT DURING RUNTIME FROM HOSTILE DOWNLOADABLES

[75] Inventor: Shlomo Touboul, Kefar-Haim, Israel

[73] Assignee: Finjan Software, Inc., San Jose, Calif.

[21] Appl. No.: 08/790,097

[22] Filed: Jan. 29, 1997

Related U.S. Application Data

[60] Provisional application No. 60/030,639, Nov. 8, 1996.

[51] Int. Cl.[7] .............................. G06F 11/30; H04L 9/00
[52] U.S. Cl. .......................................... 713/200; 709/225
[58] Field of Search .............................. 395/186, 200.55, 395/200.59; 364/222.5, 286.4, 286.5; 326/8; 711/163; 713/200, 201; 380/4, 25

[56] References Cited

U.S. PATENT DOCUMENTS

| | | | |
|---|---|---|---|
| 5,077,677 | 12/1991 | Murphy et al. ............................ | 395/10 |
| 5,359,659 | 10/1994 | Rosenthal ..................................... | 380/4 |
| 5,361,359 | 11/1994 | Tajalli et al. ............................. | 395/700 |
| 5,485,409 | 1/1996 | Gupta et al. ............................. | 395/186 |
| 5,485,575 | 1/1996 | Chess et al. ........................ | 395/183.14 |
| 5,572,643 | 11/1996 | Judson ..................................... | 395/793 |
| 5,623,600 | 4/1997 | Ji et al. ............................... | 395/187.01 |
| 5,638,446 | 6/1997 | Rubin ......................................... | 380/25 |
| 5,692,047 | 11/1997 | McManis ..................................... | 380/4 |
| 5,692,124 | 11/1997 | Holden et al. ...................... | 395/187.01 |
| 5,720,033 | 2/1998 | Deo ......................................... | 395/186 |
| 5,724,425 | 3/1998 | Chang et al. ............................. | 380/25 |
| 5,740,248 | 4/1998 | Fieres et al. ............................ | 380/25 |
| 5,761,421 | 6/1998 | Van Hoff et al. .................. | 395/200.53 |
| 5,765,205 | 6/1998 | Breslau et al. .......................... | 711/203 |
| 5,784,459 | 7/1998 | Devarakonda et al. .................... | 380/4 |
| 5,796,952 | 8/1998 | Davis et al. ........................ | 395/200.54 |
| 5,805,829 | 9/1998 | Cohen et al. ....................... | 395/200.32 |
| 5,832,208 | 11/1998 | Chen et al. ........................ | 395/187.01 |
| 5,850,559 | 12/1998 | Angelo et al. ..................... | 395/750.03 |
| 5,859,966 | 1/1999 | Hayman et al. ........................ | 395/186 |
| 5,864,683 | 1/1999 | Boebert et al. .................... | 395/200.79 |
| 5,892,904 | 4/1999 | Atkinson et al. .................. | 395/187.01 |
| 5,956,481 | 9/1999 | Walsh et al. ............................ | 395/186 |
| 5,983,348 | 11/1999 | Ji ............................................ | 713/200 |

OTHER PUBLICATIONS

IBM AntiVirus User's Guide Version 2.4, p. 6–7, Nov. 1995.
Zhang, X.N., Computer, "Secure Code Distribution," vol. 30, Jun., 1997, pp.: 76–79.
"Finjan Announces a Personal Java™ Firewall For Web Browsers—the SurfinShield™ 1.6", Press Release of Finjan Releases SurfinShield, Oct. 21, 1996, 2 pages.
"Finjan Software Releases SurfinBoard, Industry's First JAVA Security Product For the World Wide Web", Article published on the Internet by Finjan Software, Ltd., Jul. 29, 1996, 1 page.
"Powerful PC Security for the New World of Java™ and Downloadables, Surfin Shield™" Article published on the Internet by Finjan Software Ltd., 1996, 2 Pages.
"Company Profile Finjan—Safe Surfing, The Java Security Solutions Provider" Article published on the Internet by Finjan Software Ltd., Oct. 31, 1996, 3 pages.
"Finjan Announces Major Power Boost and New Features for SurfinShield™ 2.0" Las Vegas Convention Center/Pavillion 5 P5551, Nov. 18, 1996, 3 pages.

(List continued on next page.)

*Primary Examiner*—Dieu-Minh T. Le
*Attorney, Agent, or Firm*—Graham & James LLP

[57] ABSTRACT

A system and method examine execution or interpretation of a Downloadable for operations deemed suspicious or hostile, and respond accordingly. The system includes security rules defining suspicious actions and security policies defining the appropriate responsive actions to rule violations. The system includes an interface for receiving incoming Downloadable and requests made by the Downloadable. The system still further includes a comparator coupled to the interface for examining the Downloadable, requests made by the Downloadable and runtime events to determine whether a security policy has been violated, and a response engine coupled to the comparator for performing a violation-based responsive action.

8 Claims, 6 Drawing Sheets

OTHER PUBLICATIONS

"Java Security: Issues & Solutions" Article published on the Internet by Finjan Software Ltd., 1996, 8 pages.

Mark LaDue, "Online Business Consultant" Article published on the Internet, Home Page, Inc. 1996, 4 pages.

Jim K. Omura, "Novel Applications of Cryptography in Digital Communications", IEEE Communications Magazine, May 1990; pp. 21–27.

Norvin Leach et al, "IE 3.0 Applets Will Earn Certification", PC Week, v13, n29, 2 pages, Jul. 22, 1996.

Microsoft Authenticode Technology, "Ensuring Accountability and Authenticity for Software Components on the Internet", Microsoft Corporation, Oct. 1996, including contents, Introduction and pp. 1–10.

Web page: http://iel.ihs.com:80/cgi–bin/iel_cgi?se . . . 2ehts%26ViewTemplate%3ddocview%5fb%2ehts, Okamato, E. et al., "ID–Based Authentication System For Computer Virus Detection", IEEE/IEE Electronic Library online, Electronics Letters, vol. 26, Issue 15, ISSN 0013–5194, Jul. 19, 1990, Abstract and pp. 1169–1170.

SYSTEM AND METHOD FOR PROTECTING A CLIENT DURING RUNTIME FROM HOSTILE DOWNLOADABLES

CROSS-REFERENCE TO RELATED APPLICATIONS

This application is related to co-pending provisional patent application filed on Nov. 8, 1996, entitled "System and Method for Protecting a Computer from Hostile Downloadables," Ser. No. 60/030,639, by inventor Shlomo Touboul, which subject matter is hereby incorporated by reference.

BACKGROUND OF THE INVENTION

1. Field of the Invention

This invention relates generally to computer networks, and more particularly to a system and method for protecting clients from hostile Downloadables.

2. Description of the Background Art

The Internet currently interconnects about 100,000 individual computer networks and several million computers. Because it is public, the Internet has become a major source of many system damaging and system fatal application programs, commonly referred to as "viruses."

In response to the widespread generation and distribution of computer viruses, programmers continue to design and update security systems for blocking these viruses from attacking both individual and network computers. On the most part, these security systems have been relatively successful. However, these security systems are typically not configured to recognize computer viruses which have been attached to or masked as harmless Downloadables (i.e., applets). A Downloadable is a small executable or interpretable application program which is downloaded from a source computer and run on a destination computer. A Downloadable is used in a distributed environment such as in the Java™ distributed environment produced by Sun Microsystems or in the ActiveX™ distributed environment produced by Microsoft Corporation.

Hackers have developed hostile Downloadables designed to penetrate security holes in Downloadable interpreters. In response, Sun Microsystems, Inc. has developed a method of restricting Downloadable access to resources (file system resources, operating system resources, etc.) on the destination computer, which effectively limits Downloadable functionality at the Java™ interpreter. Sun Microsystems, Inc. has also provided access control management for basing Downloadable-accessible resources on Downloadable type. However, the above approaches are difficult for the ordinary web surfer to manage, severely limit Java™ performance and functionality, and insufficiently protect the destination computer.

Other security system designers are currently considering digital signature registration stamp techniques, wherein, before a web browser will execute a Downloadable, the Downloadable must possess a digital signature registration stamp. Although a digital signature registration stamp will diminish the threat of Downloadables being intercepted, exchanged or corrupted, this approach only partially addresses the problem. This method does not stop a hostile Downloadable from being stamped with a digital signature, and a digital signature does not guarantee that a Downloadable is harmless. Therefore, a system and method are needed for protecting clients from hostile Downloadables.

SUMMARY OF THE INVENTION

The present invention provides a system for protecting a client from hostile Downloadables. The system includes security rules defining suspicious actions such as WRITE operations to a system configuration file, overuse of system memory, overuse of system processor time, etc. and security policies defining the appropriate responsive actions to rule violations such as terminating the applet, limiting the memory or processor time available to the applet, etc. The system includes an interface, such as Java™ class extensions and operating system probes, for receiving incoming Downloadable and requests made by the Downloadable. The system still further includes a comparator coupled to the interface for examining the Downloadable, requests made by the Downloadable and runtime events to determine whether a security policy has been violated, and a response engine coupled to the comparator for performing the violation-based responsive action.

The present invention further provides a method for protecting a client from hostile Downloadables. The method includes the steps of recognizing a request made by a Downloadable during runtime, interrupting processing of the request, comparing information pertaining to the Downloadable against a predetermined security policy, recording all rule violations in a log, and performing a predetermined responsive action based on the comparison.

It will be appreciated that the system and method of the present invention use at least three hierarchical levels of security. A first level examines the incoming Downloadables against known suspicious Downloadables. A second level examines runtime events. A third level examines the Downloadables operating system requests against predetermined suspicious actions. Thus, the system and method of the invention are better able to locate hostile operations before client resources are damaged.

DETAILED DESCRIPTION OF THE PREFERRED EMBODIMENT

Figure 1:
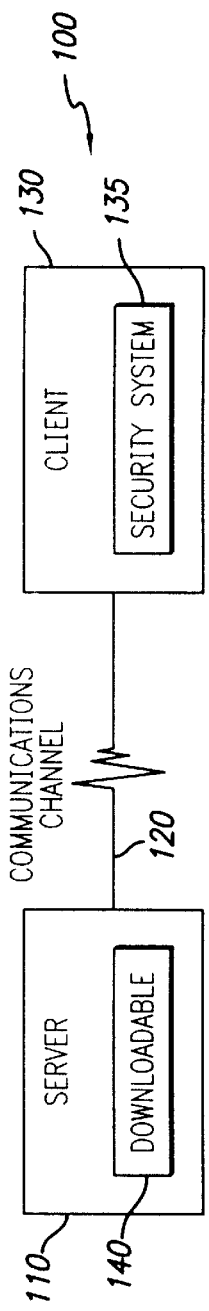
FIG. 1 is a block diagram illustrating a network system in accordance with the present invention.

FIG. 1 is a block diagram illustrating a network system 100 in accordance with the present invention. Network system 100 includes a server 110 coupled to a communications channel 120, e.g., an Internet or an Intranet. The communications channel 120 is in turn coupled to a client 130, e.g., an individual computer, a network computer, a kiosk workstation, etc., which includes a security system 135 for protecting the client 130 from hostile (i.e., will adversely effect the operational characteristics of the client 130) or suspicious (i.e., potentially hostile) downloadables.

Server 110 forwards a Downloadable 140 across the communications channel 120 to the client 130. During runtime, the security system 135 examines each Downloadable 140 and the actions of each Downloadable 140 to monitor for hostile or suspicious actions.

Figure 2:
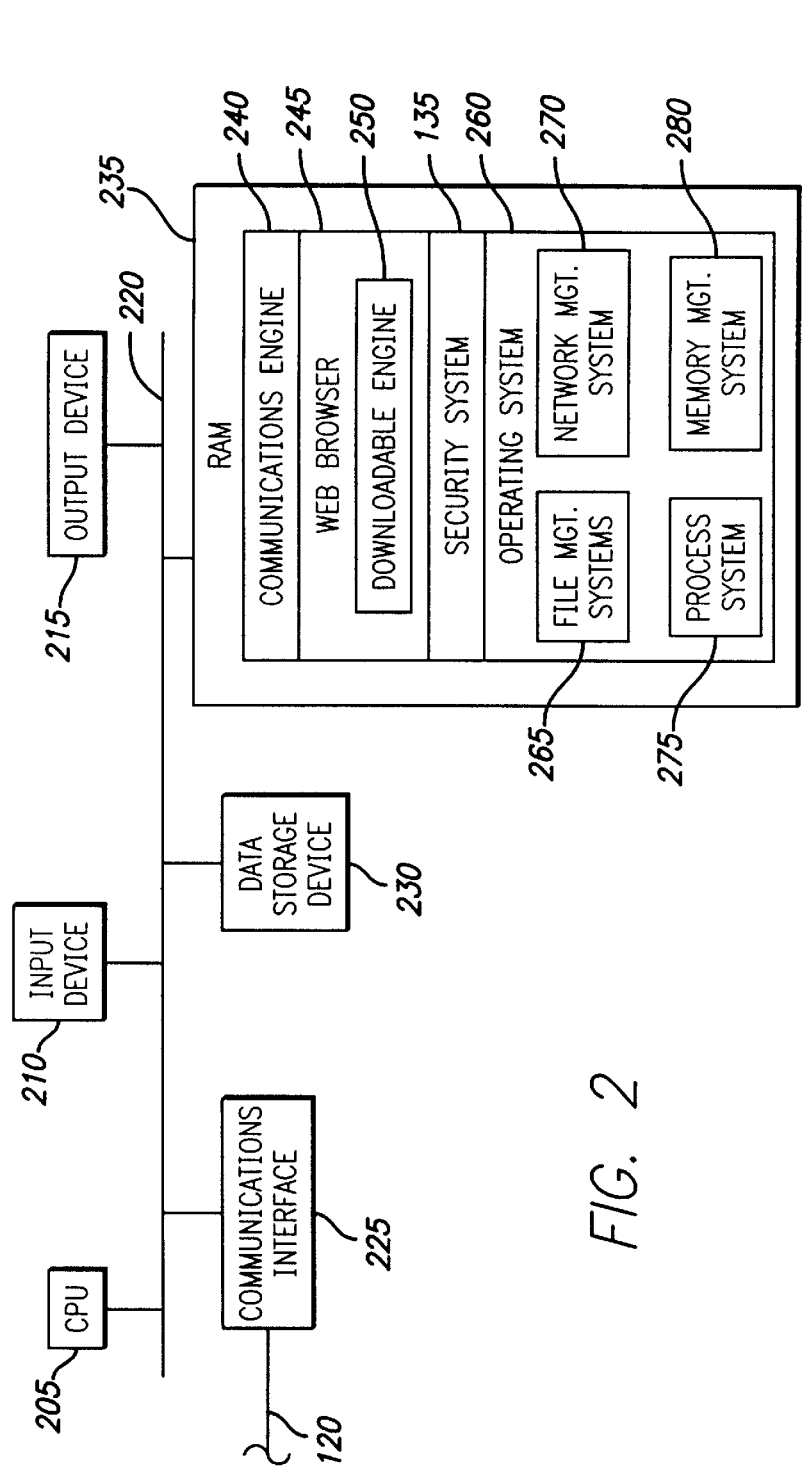
FIG. 2 is a block diagram illustrating details of the client.

FIG. 2 is a block diagram illustrating details of a client 130, which includes a Central Processing Unit (CPU) 205, such as a Motorola Power PC® microprocessor or an Intel Pentium® microprocessor, coupled to a signal bus 220. The client 130 further includes an input device 210 such as a keyboard and mouse, an output device 215 such as a Cathode Ray Tube (CRT) display, a data storage device 230 such as Read Only Memory (ROM) or magnetic disk, and a Random-Access Memory (RAM) 235, each being coupled to signal bus 220. A communications interface 225 is coupled between the communications channel 120 and the signal bus 220.

An operating system 260 controls processing by CPU 205, and is typically stored in data storage device 230 and loaded into RAM 235 for execution. The operating system 260 includes a file management system 265, a network management system 270, a process system 275 for controlling CPU 205, and a memory management system 280 for controlling memory use and allocation. A communications engine 240 generates and transfers message packets to and from the communications channel 140 via the communications interface 225, and may also be stored in data storage device 230 and loaded into RAM 235 for execution.

The client 130 further includes a web browser 245, such as the Netscape™ web browser produced by the Netscape Corporation, the Internet Explorer™ web browser produced by the Microsoft Corporation, or the Java™ Developers Kit 1.0 web browser produced by Sun Microsystems, Inc., for communicating via the communications channel 120. The web browser 245 includes a Downloadable engine 250 for managing and executing received Downloadables 140.

The client 130 further includes the security system 135 as described with reference to FIG. 1. The security system 135 may be stored in data storage device 230 and loaded into RAM 235 for execution. During runtime, the security system 135 intercepts and examines Downloadables 140 and the actions of Downloadables 140 to monitor for hostile or suspicious actions. If the security system 135 recognizes a suspicious Downloadable 140 or a suspicious request, then the security system 135 can perform an appropriate responsive action such as terminating execution of the Downloadable 140.

Figure 3:
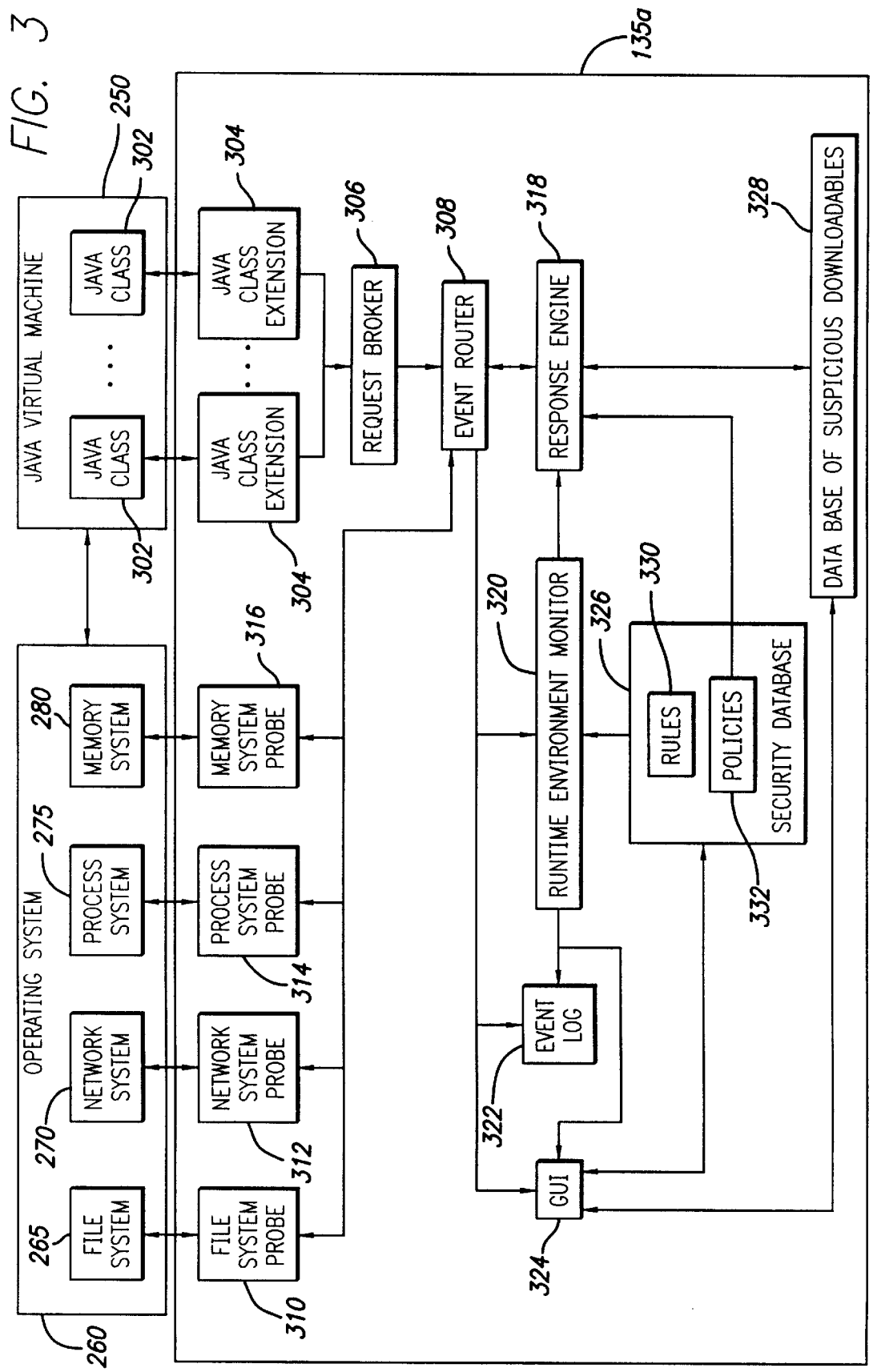
FIG. 3 is a block diagram illustrating details of a security system.

FIG. 3 is a block diagram illustrating details of the security system 135a, which is a first embodiment of security system 135 of FIG. 2 when operating in conjunction with a Java™ virtual machine 250 (i.e., the Downloadable engine 250) that includes conventional Java™ classes 302. Each of the Java™ classes 302 performs a particular service such as loading applets, managing the network, managing file access, etc. Although Downloadables are being described with reference to the Java™ distributed environment, Downloadables herein correspond to all downloadable executable or interpretable programs for use in any distributed environment such as in the ActiveX™ distributed environment.

Examples of Java™ classes used in Netscape Navigator™ include AppletSecurity.class, EmbeddedAppletFrame.class, AppletClassLoader.class, MozillaAppletContext.class, ServerSocket.class, SecurityException.class and SecurityManager.class, etc. Examples of Java™ classes used in Internet Explorer™ include AppletSecurity.class, BrowserAppletFrame.class, AppletClassLoader.class, ServerSocket.class, SecurityException.class and SecurityManager.class, etc. Other classes may include Broker.class, BCInterface.class, SocketConnection.class, queueManager.class, BrowserExtension.class, Message.class, MemoryMeter.class and AppletDescription.class.

The security system 135a includes Java™ class extensions 304, wherein each extension 304 manages a respective one of the Java™ classes 302. When a new applet requests the service of a Java class 302, the corresponding Java™ class extension 304 interrupts the request and generates a message to notify the request broker 306 of the Downloadable's request. The request broker 306 uses TCP/IP message passing protocol to forward the message to the event router 308.

The security system 135a further includes operating system probes 310, 312, 314 and 316. More particularly, a file management system probe 310 recognizes applet instructions sent to the file system 265 of operating system 260, a network system probe 312 recognizes applet instructions sent to the network management system 270 of operating system 260, a process system probe 314 recognizes applet instructions sent to the process system 275 of operating system 260, and a memory management system probe 316 recognizes applet instructions sent to the memory system 280 of operating system 260. When any of the probes 310–316 recognizes an applet instruction, the recognizing probe 310–316 sends a message to inform the event router 308.

Upon receipt of a message, the event router 308 accordingly forwards the message to a Graphical User Interface (GUI) 324 for notifying the user of the request, to an event log 322 for recording the message for subsequent analysis, and to a runtime environment monitor 320 for determining whether the request violates a security rule 330 stored in a security database 326. Security rules 330 include a list of computer operations which are deemed suspicious. Suspicious operations may include READ/WRITE operations to a system configuration file, READ/WRITE operations to a document containing trade secrets, overuse of system memory, overuse of system processor time, too many applets running concurrently, or too many images being displayed concurrently. For example, the runtime environment monitor 320 may determine that a security rule 330 has been violated when it determines that an applet uses more than two megabytes of RAM 235 or when the Java™ virtual machine 250 runs more than five applets concurrently.

Upon recognition of a security rule 330 violation, the runtime environment monitor 320 records the violation with the event log 322, informs the user of the violation via the GUI 324 and forwards a message to inform the response engine 318 of the violation. The response engine 318 analyzes security policies 332 stored in the security database 326 to determine the appropriate responsive action to the rule 330 violation. Appropriate responsive actions may include terminating the applet, limiting the memory or processor time available to the applet, etc. For example, the response engine 318 may determine that a security policy 332 dictates that when more than five applets are executed concurrently, operation of the applet using the greatest amount of RAM 235 should be terminated. Further, a security policy 332 may dictate that when an applet or a combination of applets violates a security policy 332, the response engine 318 must add information pertaining to the applet or applets to the suspicious Downloadables database 328. Thus, when the applet or applets are encountered again, the response engine 318 can stop them earlier.

The GUI 324 enables a user to add or modify the rules 330 of the security database 326, the policies 332 of the security database 326 and the suspicious applets of the suspicious Downloadables database 328. For example, a user can use the GUI 324 to add to the suspicious Downloadables database 328 applets generally known to be hostile, applets deemed to be hostile by the other clients 130 (not shown), applets deemed to be hostile by network MIS managers, etc. Further, a user can use the GUI 324 to add to the rules 330 actions generally known to be hostile, actions deemed to be hostile by network MIS managers, etc.

It will be appreciated that the embodiment illustrated in FIG. 3 includes three levels of security. The first level examines the incoming Downloadables 140 against known suspicious Downloadables. The second level examines the Downloadables' access to the Java™ classes 302. The third level examines the Downloadables requests to the operating system 260. Thus, the security system 135*a* is better apt to locate a hostile operation before an operation damages client 130 resources.

Figure 4:
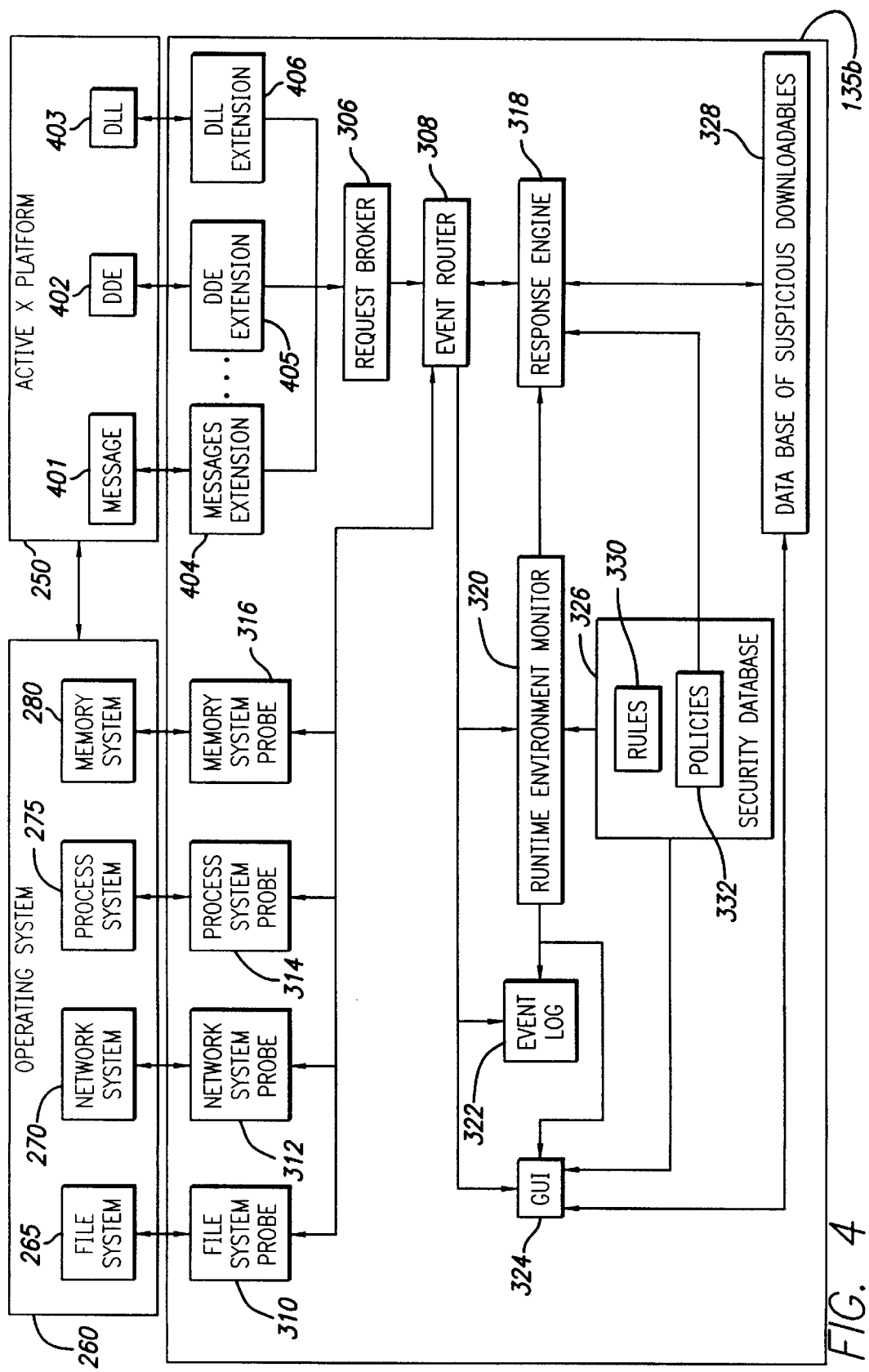
FIG. 4 is a block diagram illustrating details of an alternative security system.

FIG. 4 is a block diagram illustrating details of a security system 135*b*, which is a second embodiment of security system 135 when operating in conjunction with the ActiveX™ platform (i.e., the Downloadable engine 250) which uses message 401 calls, Dynamic-Data-Exchange (DDE) 402 calls and Dynamically-Linked-Library (DLL) 403 calls. Thus, instead of having Java™ class extensions 304, the security system 135 has a messages extension 401 for recognizing message 401 calls, a DDE extension 405 for recognizing DDE 402 calls and a DLL extension 406 for recognizing DLL calls. Upon recognition of a call, each of the messages extension 404, the DDE extension 405 and the DLL extension 406 send a message to inform the request broker 306. The request broker 306 and the remaining elements operate similarly to the elements described with reference to FIG. 3.

Figure 5:
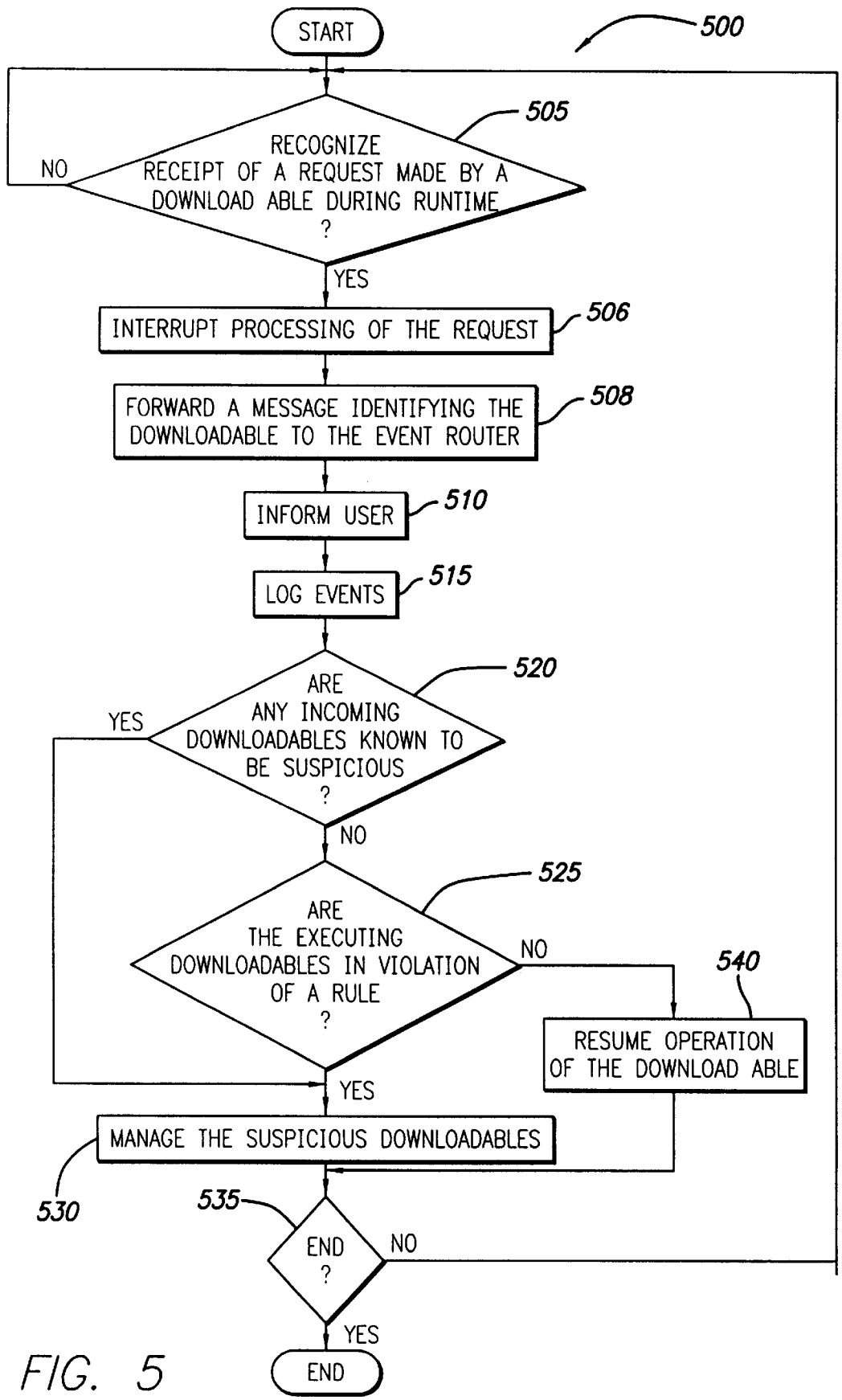
FIG. 5 is a flowchart illustrating a method for protecting a client from suspicious Downloadables.

FIG. 5 is a flowchart illustrating a method 500 for protecting a client 130 from hostile and suspicious Downloadables 140. Method 500 begins with the extensions 304, 404, 405 or 406 in step 505 waiting to recognize the receipt of a request made by a Downloadable 140. Upon recognition of a request, the recognizing extension 304, 404, 405 or 406 in step 506 interrupts processing of the request and in step 508 generates and forwards a message identifying the incoming Downloadable 140 to the request broker 306, which forwards the message to the event router 308.

The event router 308 in step 510 forwards the message to the GUI 324 for informing the user and in step 515 to the event log 322 for recording the event. Further, the event router 308 in step 520 determines whether any of the incoming Downloadables 140 either alone or in combination are known or previously determined to be suspicious. If so, then method 500 jumps to step 530. Otherwise, the runtime environment monitor 320 and the response engine 318 in step 525 determine whether any of the executing Downloadables 140 either alone or in combination violate a security rule 330 stored in the security database 332.

If a rule 330 has been violated, then the response engine 318 in step 530 manages the suspicious Downloadable 140. Step 530 is described in greater detail with reference to FIG. 6. Otherwise, if a policy has not been violated, then response engine 318 in step 540 resumes operation of the Downloadable 140. In step 535, a determination is made whether to end method 500. For example, if the user disconnects the client 130 from the server 110, method 500 ends. If a request to end is made, then method 500 ends. Otherwise, method 500 returns to step 505.

Figure 6:
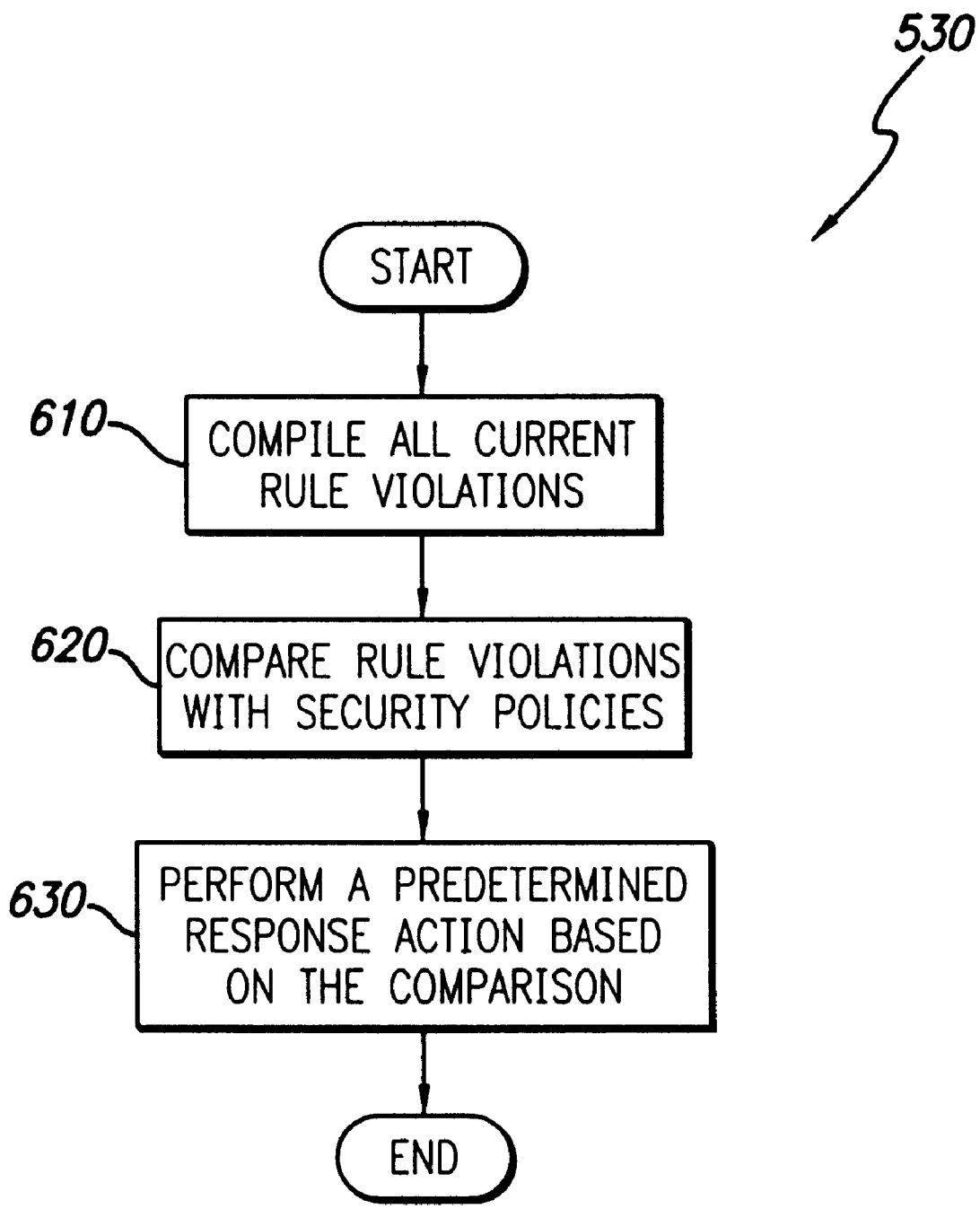
FIG. 6 is a flowchart illustrating the method for managing a suspicious Downloadable.

FIG. 6 is a flowchart illustrating details of step 530. Since multiple rule 330 violations may amount to a more serious violation and thus require a stricter response by the response engine 318, step 530 begins with the response engine 318 in step 610 compiling all rule 330 violations currently occurring. The response engine 318 in step 620 compares the compiled rule 330 violations with the security policies 332 to determine the appropriate responsive action for managing the suspicious Downloadable 140 or Downloadables 140, and in step 630 the response engine 318 performs a predetermined responsive action. Predetermined responsive actions may include sending a message via the GUI 324 to inform the user, recording the message in the event log 322, stopping execution of a suspicious Downloadable 140, storing a Downloadable 140 or combination of Downloadables 140 in the suspicious Downloadable database 328, limiting memory available to the Downloadable 140, limiting processor time available to the Downloadable 140, etc.

Figure 7:
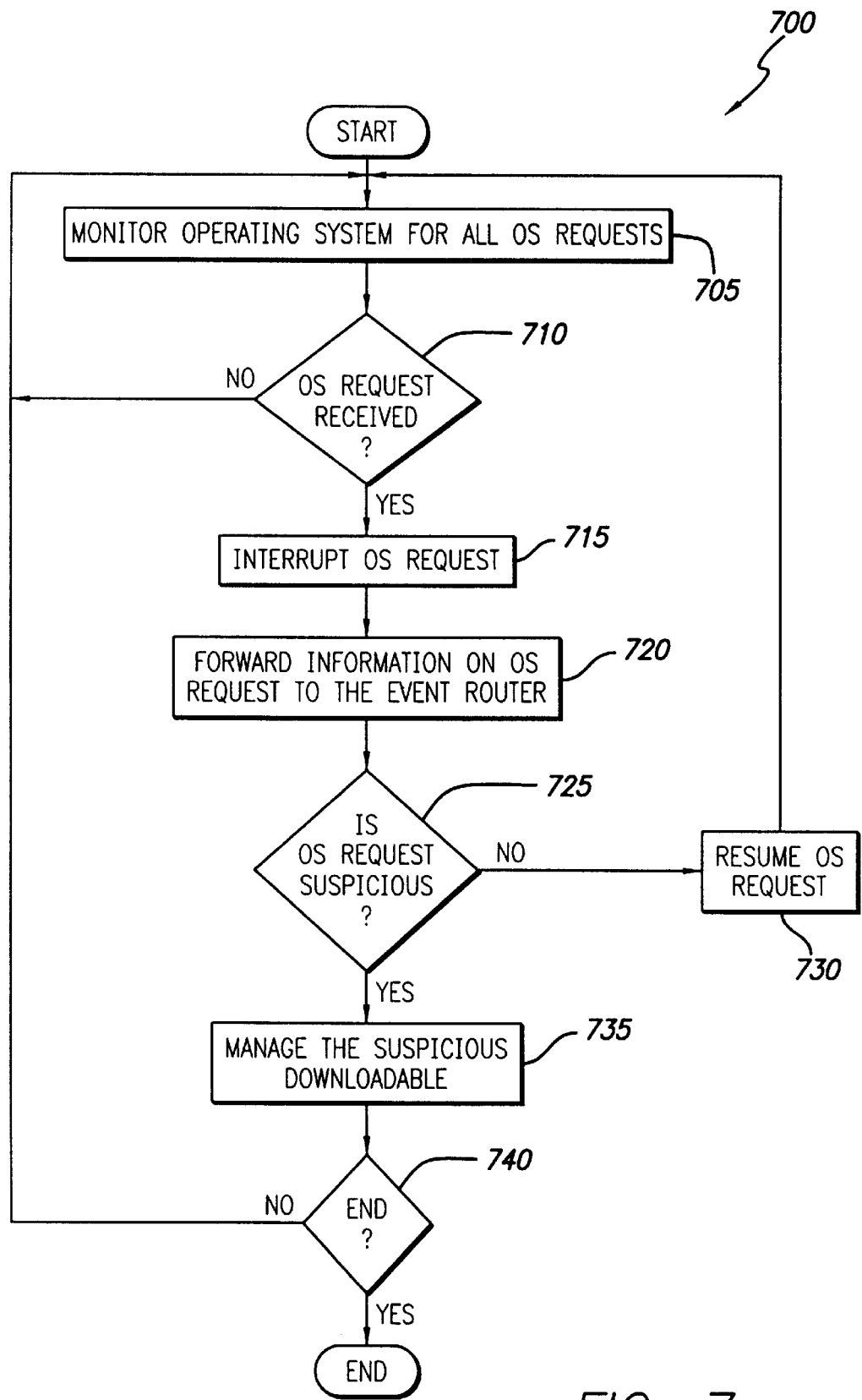
FIG. 7 is a flowchart illustrating a supplementary method for protecting a client from suspicious Downloadables.

FIG. 7 is a flowchart illustrating a supplementary method 700 for protecting a client 130 from suspicious Downloadables 140. Method 700 begins with operating system probes 310, 312, 314 and 316 in step 705 monitoring the operating system 260 for Operating System (OS) requests from Downloadables 140. As illustrated by step 710, when one of the probes 310–316 recognizes receipt of an OS request, the recognizing probe 310–316 in step 715 interrupts the request and in step 720 forwards a message to inform the event router 308.

The event router 308 in step 725 routes the information to each of the components of the security engine 135 as described with reference to FIG. 5. That is, the event router 308 forwards the information to the GUI 324 for informing the user, to the event log 322 for recordation and to the runtime environment monitor 320 for determining if the OS request violates a rule 330. The response engine 318 compares the OS request alone or in combination with other violations against security policies 332 to determine the appropriate responsive actions. It will be appreciated that, based on the security policies 332, the response engine 318 may determine that an OS request violation in combination with other OS request violations, in combination with rule 330 violations, or in combination with both other OS request violations and rule 330 violations merits a stricter responsive action.

If the OS request does not violate a security rule 330, then the response engine 318 in step 730 instructs the operating system 260 via the recognizing probe 310–316 to resume operation of the OS request. Otherwise, if the OS request violates a security rule 330, then the response engine 318 in step 730 manages the suspicious Downloadable by performing the appropriate predetermined responsive actions as described with reference to FIGS. 5 and 6. In step 740, a determination is made whether to end method 700. If a request to end the method is made, then method 700 ends. Otherwise, method 700 returns to step 705.

The foregoing description of the preferred embodiments of the invention is by way of example only, and other variations of the above-described embodiments and methods are provided by the present invention. For example, although the invention has been described in a system for protecting an internal computer network, the invention can be embodied in a system for protecting an individual computer. Components of this invention may be implemented using a programmed general purpose digital computer, using application specific integrated circuits, or using a network of interconnected conventional components and circuits. The embodiments described herein have been presented for purposes of illustration and are not intended to be exhaustive or limiting. Many variations and modifications are possible in light of the foregoing teaching. The system is limited only by the following claims.

What is claimed is:

1. A computer-based method, comprising:

monitoring the operating system during runtime for an event caused from a request made by a Downloadable;

interrupting processing of the request;

comparing information pertaining to the Downloadable against a predetermined security policy; and performing a predetermined responsive action based on the comparison, the predetermined responsive action including storing results of the comparison in an event log.

2. A computer-based method, comprising:

monitoring the operating system during runtime for an event caused from a request made by a Downloadable;

interrupting processing of the request;

comparing information pertaining to the Downloadable against a predetermined security policy; and performing a predetermined responsive action based on the comparison, the predetermined responsive action including storing the Downloadable in a suspicious Downloadable database.

3. A system, comprising:

a security policy;

an operating system interface for recognizing a runtime event caused from a request made by a Downloadable;

a comparator coupled to the interface for comparing information pertaining to the received Downloadable with the security policy;

a response engine coupled to the comparator for performing a predetermined responsive action based on the comparison with the security policy; and an event log coupled to the comparator for storing results of the comparison.

4. A system, comprising:

a security policy;

an operating system interface for recognizing a runtime event caused from a request made by a Downloadable;

a comparator coupled to the interface for comparing information pertaining to the received Downloadable with the security policy;

a response engine coupled to the comparator for performing a predetermined responsive action based on the comparison with the security policy; and a suspicious Downloadable database for storing known and previously-deemed suspicious Downloadables.

5. A system for determining whether a Downloadable, which is received by a Downloadable engine, is suspicious, comprising:

means for monitoring the operating system during runtime for an event caused from a request made by a Downloadable;

means for interrupting processing of the request;

means for comparing information pertaining to the Downloadable against a predetermined security policy; and means for performing a predetermined responsive action based on the comparison, the predetermined responsive action including storing results of the comparison in an event log.

6. A system for determining whether a Downloadable, which is received by a Downloadable engine, is suspicious, comprising:

means for monitoring the operating system during runtime for an event caused from a request made by a Downloadable;

means for interrupting processing of the request;

means for comparing information pertaining to the Downloadable against a predetermined security policy; and means for performing a predetermined responsive action based on the comparison, the predetermined responsive action including storing the Downloadable in a suspicious Downloadable database.

7. A computer-readable storage medium storing program code for causing a computer to perform the steps of:

monitoring the operating system during runtime for an event caused from a request made by a Downloadable;

interrupting processing of the request;

comparing information pertaining to the Downloadable against a predetermined security policy; and performing a predetermined responsive action based on the comparison, the predetermined responsive action including storing results of the comparison in an event log.

8. A computer-readable storage medium storing program code for causing a computer to perform the steps of:

monitoring the operating system during runtime for an event caused from a request made by a Downloadable;

interrupting processing of the request;

comparing information pertaining to the Downloadable against a predetermined security policy; and performing a predetermined responsive action based on the comparison, the predetermined responsive action including storing the Downloadable in a suspicious Downloadable database.

* * * * *

UNITED STATES PATENT AND TRADEMARK OFFICE
CERTIFICATE OF CORRECTION

| | |
|---|---|
| PATENT NO. | : 6,167,520 |
| DATED | : December 26, 2000 |
| INVENTOR(S) | : Shlomo Touboul |

It is certified that error appears in the above-identified patent and that said Letters Patent is hereby corrected as shown below:

Title page,
Item [73], Assignee, "Finjan Software, Inc., San Jose, Calif.," after "Finjan Software," change "Inc., San Jose, Calif." to -- Ltd., Kefar Haim, Israel --.

Signed and Sealed this

Seventh Day of February, 2006

JON W. DUDAS
*Director of the United States Patent and Trademark Office*

(12) EX PARTE REEXAMINATION CERTIFICATE (9830th)
United States Patent
Touboul

(10) Number: US 6,167,520 C1
(45) Certificate Issued: Sep. 6, 2013

(54) SYSTEM AND METHOD FOR PROTECTING A CLIENT DURING RUNTIME FROM HOSTILE DOWNLOADABLES

(75) Inventor: Shlomo Touboul, Kefar-Haim (IL)

(73) Assignee: Finjan Software, Ltd., Kefar-Haim (IL)

Reexamination Request:
No. 90/008,684, Jun. 6, 2007

Reexamination Certificate for:
Patent No.: 6,167,520
Issued: Dec. 26, 2000
Appl. No.: 08/790,097
Filed: Jan. 29, 1997

Certificate of Correction issued Feb. 7, 2006

Related U.S. Application Data

(60) Provisional application No. 60/030,639, filed on Nov. 8, 1996.

(51) Int. Cl.
*G06F 21/51* (2013.01)
*G06F 21/53* (2013.01)

(52) U.S. Cl.
USPC ............................................ 726/23; 709/225

(58) Field of Classification Search
None
See application file for complete search history.

(56) References Cited

To view the complete listing of prior art documents cited during the proceeding for Reexamination Control Number 90/008,684, please refer to the USPTO's public Patent Application Information Retrieval (PAIR) system under the Display References tab.

*Primary Examiner* — Majid Banankhah

(57) ABSTRACT

A system and method examine execution or interpretation of a Downloadable for operations deemed suspicious or hostile, and respond accordingly. The system includes security rules defining suspicious actions and security policies defining the appropriate responsive actions to rule violations. The system includes an interface for receiving incoming Downloadable and requests made by the Downloadable. The system still further includes a comparator coupled to the interface for examining the Downloadable, requests made by the Downloadable and runtime events to determine whether a security policy has been violated, and a response engine coupled to the comparator for performing a violation-based responsive action.

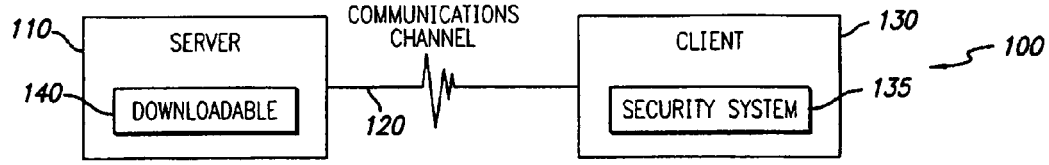

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-8 are cancelled.

\* \* \* \* \*